United States Patent
Boran et al.

(10) Patent No.: US 7,443,310 B2
(45) Date of Patent: Oct. 28, 2008

(54) REMOTE SENSOR NETWORK SYSTEM WITH REDUNDANCY

(75) Inventors: Colm Boran, Novi, MI (US); Myron Senyk, Rochester Hills, MI (US); David Eiswerth, Wixom, MI (US)

(73) Assignee: Autoliv ASP, Inc., Ogden, UT (US)

( * ) Notice: Subject to any disclaimer, the term of this patent is extended or adjusted under 35 U.S.C. 154(b) by 428 days.

(21) Appl. No.: 11/287,134

(22) Filed: Nov. 23, 2005

(65) Prior Publication Data
US 2007/0115103 A1   May 24, 2007

(51) Int. Cl.
*G08B 21/00* (2006.01)

(52) U.S. Cl. ............... 340/660; 340/661; 340/662; 340/538; 340/533; 324/600

(58) Field of Classification Search ............... 340/635, 340/657, 660, 661, 662, 663, 533–538, 509, 340/506, 517, 518; 307/1–8; 324/600, 691
See application file for complete search history.

(56) References Cited

U.S. PATENT DOCUMENTS

| | | | |
|---|---|---|---|
| 3,952,286 A | 4/1976 | Wakamatsu et al. | |
| 4,578,591 A | 3/1986 | Floyd et al. | |
| 4,736,367 A | 4/1988 | Wroblewski et al. | |
| 5,112,080 A | 5/1992 | Okano | |
| 5,914,655 A | 6/1999 | Clifton et al. | |
| 6,173,229 B1 | 1/2001 | Fennel et al. | |
| 6,205,383 B1 | 3/2001 | Hermann | |
| 6,226,578 B1 | 5/2001 | Willerton et al. | |
| 6,513,831 B2 | 2/2003 | Stierle et al. | |
| 6,608,555 B1 * | 8/2003 | Chang | 340/439 |
| 6,735,508 B2 | 5/2004 | Winkler | |
| 7,167,089 B2 * | 1/2007 | Chen | 340/538 |
| 2003/0011179 A1 | 1/2003 | Fogle, Jr. | |

FOREIGN PATENT DOCUMENTS

| | | |
|---|---|---|
| EP | 0 989 032 A2 | 3/2000 |
| JP | 2003061916 | 9/2004 |

* cited by examiner

*Primary Examiner*—George A Bugg
*Assistant Examiner*—Hoi C Lau
(74) *Attorney, Agent, or Firm*—Sally J Brown; Brinks Hofer Gilson & Lione

(57) ABSTRACT

A multi-sensor network having a plurality of receivers and sensors connected to a common communication line is provided. A controller will activate one of the plurality of receivers, thereby allowing one of the plurality of sensors to transmit data to the communication line. The plurality of sensors each individually have a logic device preventing more than one sensor from transmitting data in a given time interval.

11 Claims, 1 Drawing Sheet

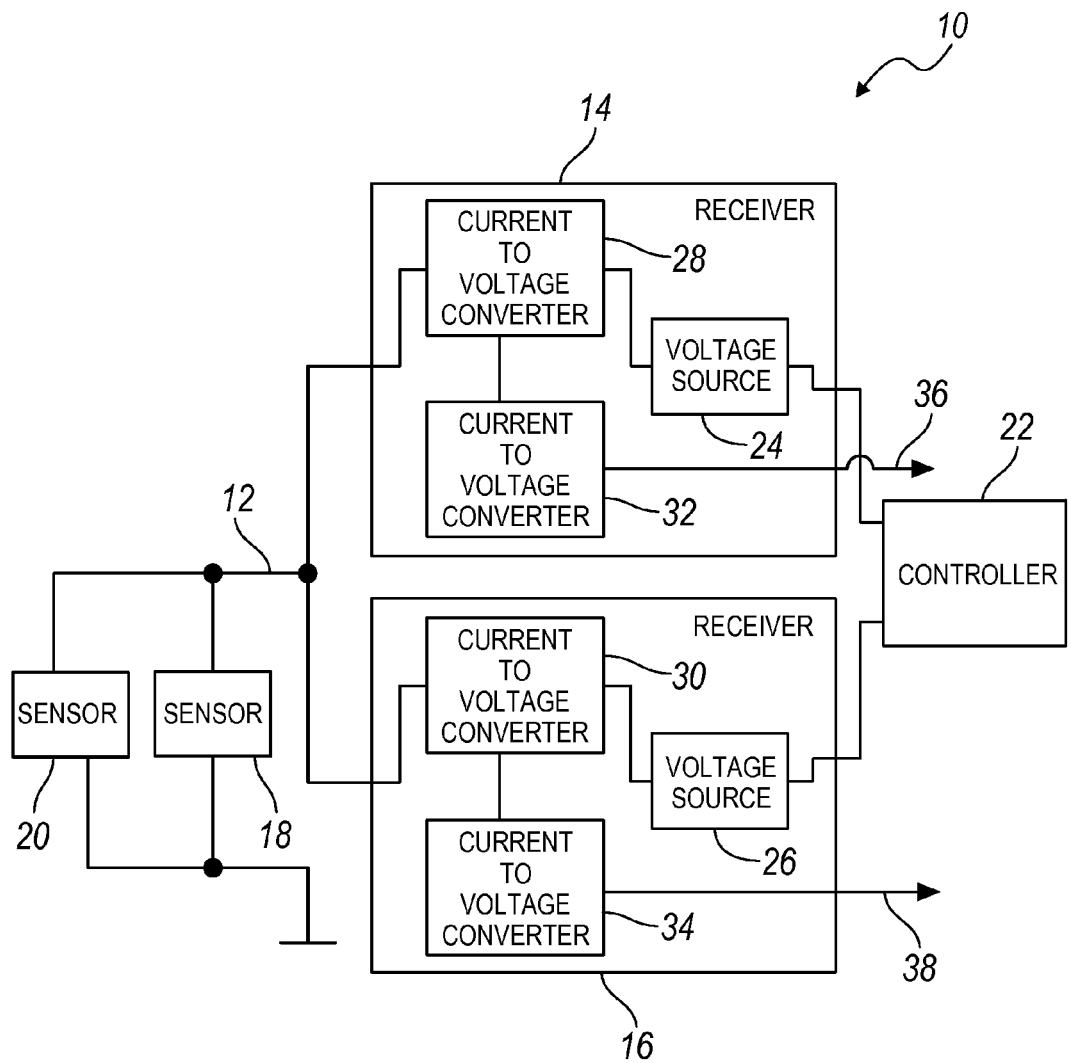
FIGURE

REMOTE SENSOR NETWORK SYSTEM WITH REDUNDANCY

BACKGROUND OF THE INVENTION

1. Field of the Invention

The present invention generally relates to remote sensor networks in a motor vehicle and more particularly to remote sensor networks in a motor vehicle having multiple sensors and multiple receivers.

2. Description of the Known Technology

Automobiles are equipped with sensors for detecting a variety of conditions and receivers for receiving the output of these sensors. An automobile collision is a condition for which sensors are used to detect. When the sensors receive data indicative of an automobile collision, multiple safety devices will be activated to reduce injury to the occupants of the vehicle. Because of the great importance placed on the protection of the occupants during a vehicle collision, multiple sensors and receivers are frequently utilized.

Typically, each sensor is monitored by a dedicated single receiver. If the receiver fails, the sensor paired with the failed receiver is rendered useless. Therefore, it is desired to provide a sensor network which can route data from individual sensors to specific receivers in case one or more of the receivers fail. As long as one receiver is functioning properly, the sensors can be monitored by the one functioning receiver.

One solution to this problem is the implementation of a daisy chain multiple sensors and receivers connected to a serial communication line. However, for serial communication, there must be at least two lines of communication between the devices and additional hardware is required in order to correctly receive data from the sensors and route data to the receivers on the daisy chain, making this solution costly to implement Therefore, there exists a need for a cost effective solution that allows data from multiple sensors to be routed to a specific receiver.

BRIEF SUMMARY OF THE INVENTION

An embodiment of the sensor system in accordance with the present invention includes a plurality of sensors and a plurality of receivers connected to a communication line, and a controller connected to the receivers, whereby the controller can selectively and individually activate and deactivate the receivers. The sensors will each include a logic device. The logic device is configured to prevent the sensors from communicating on the communication line simultaneously.

Preferably, the plurality of receivers individually include a voltage regulator, whereby the voltage regulator provides a current to the communication line. The plurality of receivers may also include a current sensing device for sensing the amount of current provided to the communication line from the receiver. Additionally, a current-to-voltage converter may be connected to the current sensing device to determine a voltage based on the amount of current provided by the receiver to the communication line.

An embodiment of the method of operating a sensor system in accordance with the present invention includes providing a first receiver and a second receiver connected to a communication line, activating the first receiver during a first time interval, providing the output of a first sensor to the communication line during the first time interval, activating the second receiver during a second time interval, and providing the output of a second sensor to the communication line during the second time interval. The method may further comprise deactivating the first receiver and/or removing the output of the first sensor to the communication line during the second time interval. The method may further include the steps of providing an amount of current to the communication line from the first receiver during the first time interval and converting the amount of current provided by the first receiver to the communication line to a voltage value. Likewise, the method may further comprise providing an amount of current to the communication line from the second receiver during the second time interval and converting the amount of current provided by the second receiver to the communication line to a voltage value.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

The FIGURE shows a block diagram of the multi-sensor network embodying the principles of the present invention.

DETAILED DESCRIPTION

Referring now to the FIGURE, a multi-sensor network 10 is shown. The multi-sensor network 10 includes a communication line 12 connected to a first receiver 14, a second receiver 16, a first sensor 18 and a second sensor 20. Connected to the first receiver 14 and the second receiver 16 is a controller 22.

The first receiver 14 and the second receiver 16 have a first variable voltage source 24 and a second variable voltage source 26 respectively, The first and second variable voltage sources 24 and 26 are connected to the controller 22. As will be fully described later, the controller 22 selectively controls the output of the first and second variable voltage sources 24 and 26 which will provide the current to communication line 12. The current provided by the receivers 14 and 16 to the sensors 18 and 20 via the communication line 12 will correspond with the current modulated output of the sensors 18 and 20.

Connected to the first variable voltage source 24 is a first current sensor 28. Connected to the second variable voltage source 26 is a second current sensor 30. The first and second output current sensors 28 and 30 will measure the amount of current to the communication line 12 provided by the first and second receivers 14 and 16, respectively. Connected to the first and second output current sensors are first and second current-to-voltage converters 32 and 34. The first and second current-to-voltage converters 32 and 34 will monitor the output current sensors 28 and 30, respectively, and output a voltage value corresponding to the amount of current provided by the first receiver 14 and the second receiver 16 to the communication line 12.

As stated earlier, the current provided by the receivers 14 and 16 to the sensors 18 and 20 via the communication line 12, will correspond with the output of the sensors 18 and 20. Therefore, the voltage values produced by the current-to-voltage converters 32 and 34 will correspond with the output of the sensors 18 and 20. The voltage values produced by the current-to-voltage converters 32 and 34 will then be transmitted to outputs 36 and 38 respectively. The outputs 36 and 38 may be connected to a safety device control system (not shown) which may activate one or more safety systems based on the voltage values received.

As stated previously, the first sensor 18 and second sensor 20 are connected to the communication line 12. The first sensor 18 and the second sensor 20 are both current modulated output sensors. When in operation, the first sensor 18 and second sensor 20 will modulate the current provided by one of the receivers 14 or 16 to correspond with a sensed condition. The current modulated by the first and second sensors 18 and 20 may be representative of acceleration, deformation or other types of conditions.

Additionally, the first sensor 18 and the second sensor 20 contain a logic device which prevents the first sensor 18 and the second sensor 20 from outputting their data to the communication line 12 during the same time interval.

Although the above embodiment only shows two sensors 18 and 20 and two receivers 14 and 16 connected to the common line 12, a plurality of sensors and receivers may be connected to the common line 12. Like the first and second receivers 14 and 16, the plurality of receivers will be individually connected to and controlled by controller 22. Like the first and second sensors 18 and 20, the plurality of sensors will individually have a logic device that will prevent the plurality of sensors from outputting their data to the communication line 12 simultaneously.

The preceding paragraphs described the components of the multi-sensor network 10. The following paragraphs will describe the operation of the multi-sensor network 10.

As stated earlier, a controller 22 controls the first and second variable voltage sources 24 and 26. The controller 22 can adjust the variable voltage sources 24 and 26 so that one of the variable voltage sources 24 and 26 will have a higher voltage than the other variable voltage source 24 and 26. The receiver 14 or 16 with the higher variable voltage source 24 or 26 will provide all the current to the communication line. The first sensor 18 or the second sensor 20, depending on which sensor is outputting data, will modulate the current provided by the variable voltage source 24 or 26 having the higher voltage.

For example, assume that the controller 22 has instructed the variable voltage output 24 to provide a voltage that is greater than the variable voltage output 26, thereby "activating" the first receiver 14. The voltages provided by the variable voltage output sources 24 and 26 will both be provided to the communication line 12. However, because the voltage provided by the first variable voltage source 24 is greater than the voltage provided by the second variable voltage source 26, the current provided to the communication line 12 will only be provided by the first variable voltage source 24. Because only the first variable voltage source provides current to the communication line 12, the output current sensor 28 will be able to monitor all the current provided to the communication line 12. In turn, the current-to-voltage converter 32 will be able to measure a voltage that is representative of the amount of current flowing from the first variable voltage source 24 to the communication line 12. This amount of current provided to the communication line 12 will correspond to the output of the either the first sensor 18 or the second sensor 20.

The first sensor 18 and the second sensor 20 both have a logic device to prevent both the first sensor 18 and the second sensor 20 from modulating the current provided by the communication line 12 at the same time. Initially, a synchronization pulse will be provided by either the first variable voltage source 24 or the second variable voltage source 26 to the communication line 12. The logic devices of the first sensor 18 and the second sensor 20 will receive the synchronization pulse and the logic device of the first sensor 18 will instruct the first sensor 18 to transmit its data by current modulation before the second sensor 20. After the first sensor 18 has transmitted its data by current modulation, the logic device of the second sensor 20 will instruct the second sensor 20 to transmit its data by current modulation during a second time interval.

In operation, the controller 22 will have the first variable voltage source 24 output a voltage that is greater than the variable voltage source 26 when the first sensor 18 is transmitting data to the communication line 12. Conversely, the controller 22 will instruct the second variable voltage source 26 to output a voltage that is greater than the variable voltage source 24, when the second sensor 20 is transmitting its data to the communication line 12.

Although the above method only details the operation of two receivers and two sensors, a plurality of sensors and receivers may be employed. The method permits one of the plurality of sensors and one of the plurality receivers to communicate via the communication line 12 during a specific time interval. The other sensors and receivers will be allowed to communicate via the communication line 12 at different time intervals.

As a person skilled in the art will appreciate, the above description is meant as an illustration of implementation of the principles this invention. This description is not intended to limit the scope or application of this invention in that the invention is susceptible to modification, variation and change, without departing from the spirit of this invention, as defined in the following claims.

We claim:

1. A motor vehicle sensor system comprising:
   a communication line;
   a plurality of receivers connected to the communication line, each of the plurality of receivers having a variable voltage regulator configured to selectively provide a current to the communication line, one of the receivers being configured to provide a synchronization pulse to the communication line;
   a plurality of sensors connected to a communication line, each of the plurality of sensors having a logic device configured to prevent more than one of the plurality of sensors from communicating with the communication line simultaneously based on the synchronization pulse; and
   a controller connected to the plurality of receivers and configured to adjust the variable voltage regulators when one of the plurality of sensors is communicating with the communication line, such that one of the variable voltage regulators produces a voltage greater than the other variable voltage regulators, whereby the variable voltage regulator with the greater voltage provides the current to the communication line.

2. The system of claim 1, wherein the plurality of receivers individually include a current sensing device, whereby the current sensing device is configured to determine the amount of current provided by the receiver to the communication line.

3. The system of claim 2, further comprising a current-to-voltage converter connected to the current sensing device and configured to determine a voltage based on the amount of current provided by the receiver to the communication line and output the voltage base on a current amount.

4. The system of claim 1, wherein the plurality of sensors are current modulated sensors.

5. The system of claim 4 wherein the current modulated sensors are acceleration sensors.

6. The system of claim 4, wherein the current modulated sensors are deformation sensors.

7. The system of claim 4, wherein the current modulated sensors are pressure sensors.

8. A sensor system for a motor vehicle comprising:

a communication line;

a plurality of receivers connected to the communication line, each of the plurality of receivers having a variable voltage regulator configured to selectively provide a current to the communication line, one of the receivers is configured to provide a synchronization pulse to the communication line;

a current sensing device configured to determine the amount of current provided by the variable voltage regulator to the communication line;

a current-to-voltage converter connected to the current sensing device and configured to determine a voltage based on the amount of current provided by the variable voltage regulator to the communication line and output the voltage based on the current amount;

a plurality of sensors connected to a communication line, the plurality of sensors individually having a logic device configured to prevent more than one of the plurality of sensors from communicating with the communication line simultaneously based on the synchronization pulse; and a controller connected to the plurality of receivers and configured to adjust the variable voltage regulators when one of the plurality of sensors is communicating with the communication line, such that one of the variable voltage regulators produces a voltage greater than the other variable voltage regulators, whereby the variable voltage regulator with the greater voltage provides the current to the communication line.

9. The system of claim the 8, wherein the plurality of sensors are current modulated sensors.

10. The system of claim 8, wherein the current modulated sensors are acceleration sensors.

11. The system of claim 8, wherein the current modulated sensors are deformation sensors.

* * * * *